(12) United States Patent
Lueh et al.

(10) Patent No.: US 10,282,227 B2
(45) Date of Patent: May 7, 2019

(54) EFFICIENT PREEMPTION FOR GRAPHICS PROCESSORS

(71) Applicant: Intel Corporation, Santa Clara, CA (US)

(72) Inventors: Guei-Yuan Lueh, San Jose, CA (US); Subramaniam Maiyuran, Gold River, CA (US); Wei-Yu Chen, Santa Clara, CA (US); Kaiyu Chen, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 14/543,982

(22) Filed: Nov. 18, 2014

(65) Prior Publication Data

US 2016/0140686 A1    May 19, 2016

(51) Int. Cl.
*G06F 9/46* (2006.01)

(52) U.S. Cl.
CPC .................... *G06F 9/462* (2013.01)

(58) Field of Classification Search
CPC ........................................ G06F 9/462
USPC ........................................ 717/140
See application file for complete search history.

(56) References Cited

U.S. PATENT DOCUMENTS

| | | | | |
|---|---|---|---|---|
| 3,789,365 A * | 1/1974 | Jen | ........................... | G06F 9/461 710/264 |
| 6,061,711 A | 5/2000 | Song et al. | | |
| 7,831,961 B1 * | 11/2010 | Bush | ........................ | G06F 8/458 707/813 |
| 8,135,894 B1 * | 3/2012 | Ball | .......................... | G06F 13/26 710/264 |
| 2002/0052993 A1 * | 5/2002 | Dowling | .................. | G06F 9/462 710/260 |
| 2005/0039189 A1 | 2/2005 | Anderson et al. | | |
| 2006/0117325 A1 * | 6/2006 | Wieland | .................. | G06F 9/468 719/321 |
| 2007/0136733 A1 | 6/2007 | Park et al. | | |
| 2010/0192153 A1 | 7/2010 | Uysal et al. | | |

(Continued)

FOREIGN PATENT DOCUMENTS

WO    2005048010 A2    5/2005

OTHER PUBLICATIONS

Snyder et al, Fast context switches: Compiler and architectural support for preemptive scheduling; 1995, Microprocessors and Microsystems.*

(Continued)

*Primary Examiner* — Li B. Zhen
*Assistant Examiner* — Zengpu Wei
(74) *Attorney, Agent, or Firm* — Jordan IP Law, LLC

(57) ABSTRACT

Systems and methods may provide for inserting one or more preemption instructions while compiling a computer program. The one or more preemption instructions being inserted within a preemption window in the computer program reduces the number of live registers at each preemption instruction position. Further, the preemption instruction instructs which registers are to be saved at a particular program position, typically the registers that are live at that program position. The compiled program may be run in an execution unit. A preemption request may be made to the execution unit and executed at a next available preemption instruction in the program being run in the execution unit.

22 Claims, 15 Drawing Sheets

(56) References Cited

U.S. PATENT DOCUMENTS

| | | | |
|---|---|---|---|
| 2012/0144081 A1* | 6/2012 | Smith | G06F 13/24 710/269 |
| 2013/0132711 A1* | 5/2013 | Shah | G06F 9/461 712/228 |
| 2013/0283243 A1* | 10/2013 | Bates | G06F 11/3624 717/129 |
| 2014/0022263 A1 | 1/2014 | Hartog et al. | |
| 2014/0184617 A1* | 7/2014 | Palmer | G06T 1/20 345/506 |

OTHER PUBLICATIONS

International Search Report and Written Opinion for PCT Patent Application No. PCT/US2015/059405, dated Feb. 25, 2016, 13 pages.

European Search Report for EP Patent Application No. 15861336.4, dated Jun. 8, 2018, 11 pages.

* cited by examiner

EFFICIENT PREEMPTION FOR GRAPHICS PROCESSORS

TECHNICAL FIELD

Embodiments generally relate to preemption for graphics processors. More particularly, embodiments relate to efficient preemption mechanisms for graphics processing units (GPUs).

BACKGROUND

With increasing complexity of graphics workloads and expanding application domains, graphics architecture may be shifting towards more general purpose, fast, and responsive designs. Traditionally, a graphics processing unit (GPU) may be used to accelerate specific three dimensional (3D) graphics applications, wherein a different task waits for the previous context to be finished and drained from the pipeline before it can be serviced. Following the recent development of a graphics programming and multitasking driver model, recent GPUs tend to offer increasingly programmable execution units (EU) that are not only useful for graphics purposes such as computing 3D shader functions, but also media codec functions as well as other general purpose workloads offloaded from the central processing unit (CPU). While multiple tasks can use the GPU in a time-sharing manner, some applications, in particular, touch user interfaces or real-time systems, demand that high-priority tasks submitted to the GPU be performed within a certain time budget. These applications typically involve preemption, which may allow a GPU to temporarily stall current work, switch to a different context following a preemption request, and resume the stalled work after it finishes the higher-priority task it performed as a result of the preemption request.

Existing GPU platforms may provide basic support for enabling preemption. When the execution unit receives an exception raised from the preemption request, it may stop issuing further instructions from the application thread, save the current instruction pointer, and load a system routine to handle the exception. To ensure functional correctness, the system routine may be responsible for saving the current application's execution states and restoring them later when the execution is resumed. Since the preemption request may be raised when any instruction is running, conventional hardware may conservatively save all system states that may be altered during the current execution context. This approach may typically involve saving the contents of all registers contained in the general register file (GRF) and the architecture register file (ARF). The General Register File (GRF) includes general purpose read-write registers while the Architectural Register File (ARF) includes architectural registers defined for specific purposes such as address registers, accumulators, flags, etc. The majority of the overhead in supporting preemption may result from saving and restoring such execution states, which may significantly slow down the overall system performance and responsiveness. Existing GPUs already provide a large register set in order to speed up computation, and as a result, each context switch may involve saving up to multiple megabytes of data. With the growing number of execution units integrated on emerging GPU platforms, the corresponding amount of states to be saved/restored and the resulting preemption response time can greatly impact system performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
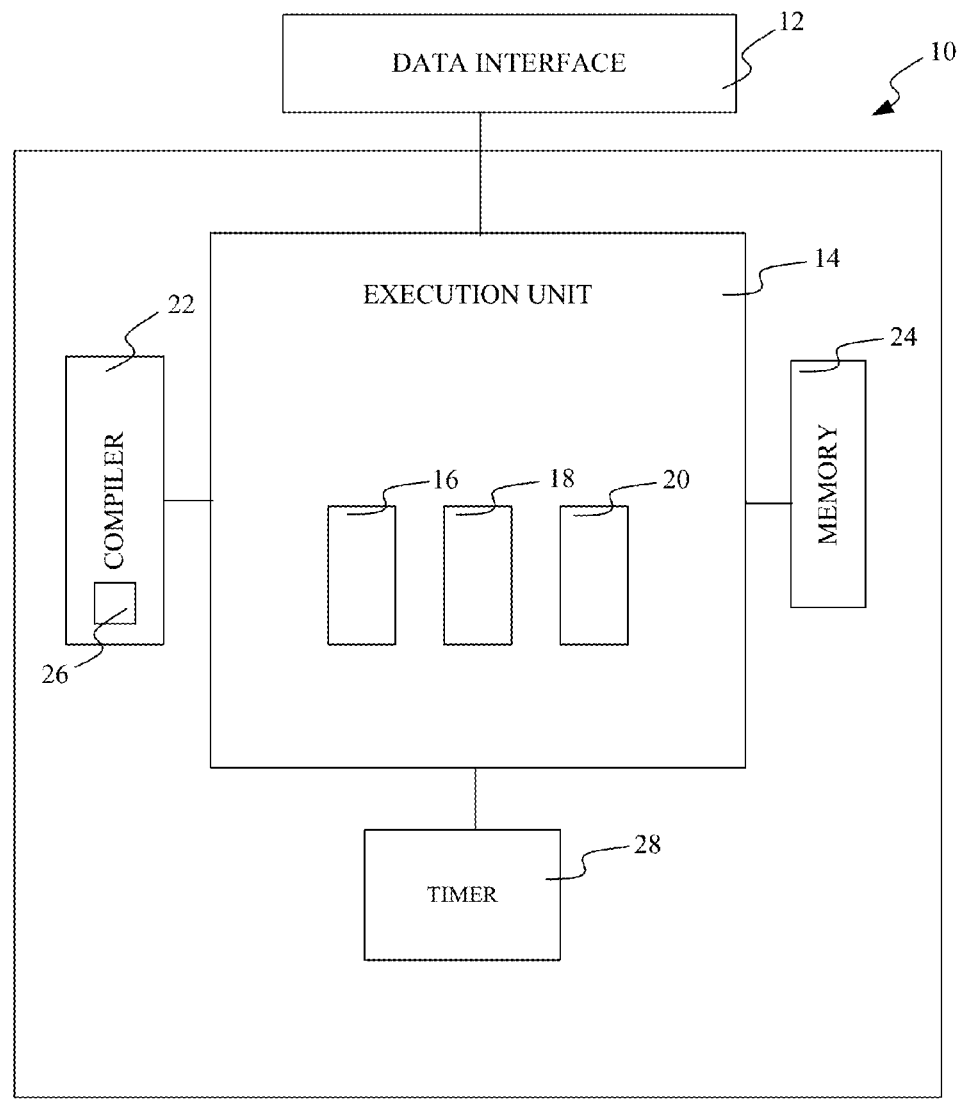
FIG. 1 is a block diagram of an example of a portion of a computer system according to an embodiment.

FIG. 1 depicts a computer system including a portion of a graphics processing unit (GPU, e.g., graphics processor) 10 according to an embodiment. The illustrated GPU 10 includes one or more execution units 14. Each execution unit 14 may include GRF 16, ARF 18, and a control flow stack 20. Each of the GRF 16 and ARF 18 may include multiple registers with multiple register files. In the illustrated example, a data interface 12 communicates with the GPU 10 to send a preemption request to the execution unit.

A compiler 22 may compile application programs to be executed by the execution unit 14. The illustrated compiler 22 includes a preemption instruction creator and inserter 26 to create and insert preemption instructions into a compiling program. Additionally, a memory 24 may communicate with execution unit 14. The memory 24 may receive contents of the live registers during execution of a preemption instruction. An optional timer 28 may communicate with the execution unit 14 to cause immediate execution of a preemption request under the circumstances discussed below.

Figure 2:
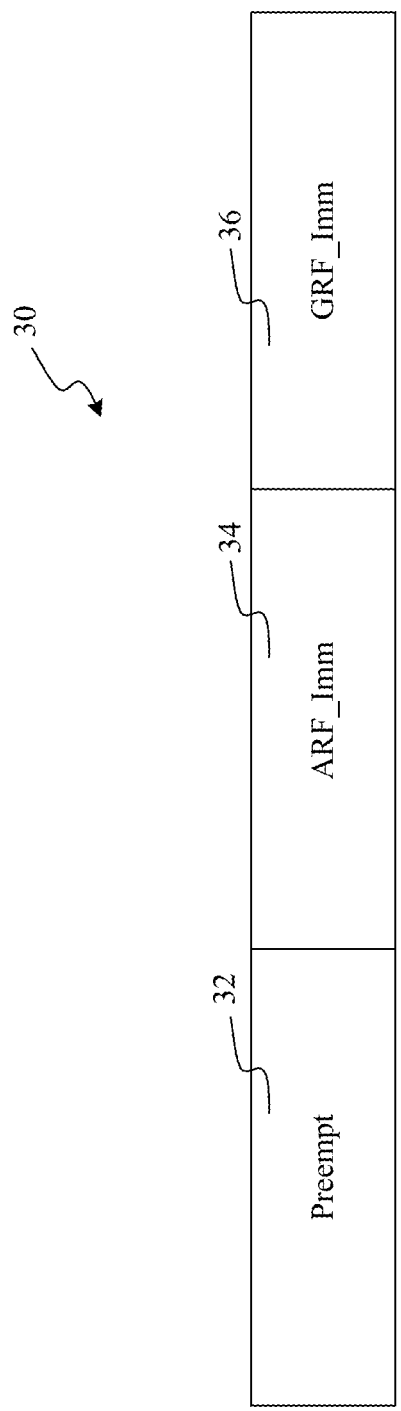
FIG. 2 is an illustration of an example of an instruction format according to an embodiment.

The compiler 22 may insert an instruction from preemption instruction creator and inserter 26 when compiling a program to be executed in execution unit 14. FIG. 2 is an example of a preemption instruction that is inserted into a compiling program at locations that reduce the number of live registers whose content needs to be saved during execution of a preemption request. In the illustrated example, an instruction 30 has a general 3-part format. The first part 32 may be the preempt command itself. The second part 34 may relate to the architecture registers while the third part 36 may relate to the general purpose registers. In one example, the preempt command part 32 can be an 8-bit opcode corresponding to the preempt command. In the second part 34, bits 50-63 can be a 14-bit immediate value where each bit tells whether the corresponding architectural register is to be saved/restored. In the third part 36, bits 64-127 can be the 64-bit immediate value where each bit tells whether its corresponding two general-purpose registers are to be saved/restored. Note that the illustrated instruction 30 is only an example of an instruction that can be inserted by the compiler and that other formats may be used.

In particular, it is noted that the size and granularity of different architectural registers can vary. Therefore the encoding for the architectural register immediate value can be flexible depending upon the number of available bits, the overhead in saving additional sub-registers, and the complexity in decoding logic. For example, the bits used to represent different architectural registers can be unified if they fit into the same cache line. Alternatively the remaining reserved bits may be used to distinguish among different address sub-registers if doing so will further reduce the context save/restore overhead.

With continuing reference to FIGS. 1 and 2, the compiler preemption instruction creator and inserter 26 may insert the preemption instruction 30 at various points in a program being compiled. At compile time, the preemption instruction 30 may be inserted at program locations based on register pressure and a preemption window. Register pressure indicates how many registers are concurrently live at a program location. The number of live registers may be calculated through liveness analysis. Liveness analysis is typically an integral part of register allocation (RA) performed in the compiler. Other approaches can also be used to determine register pressure. The result may be determined conservatively so that it includes any potential register that may be used, to ensure functional correctness after context switch. For architectural registers that are only used for special purposes, such as accumulator registers or control registers, the compiler 22 may perform a context insensitive analysis to determine if they are used at all in the current program.

The higher the register pressure, that is, the more simultaneous live registers, the more execution states may be saved/restored, which may lead to higher preemption cost (time, memory usage, etc.). Therefore, preemption instructions can be inserted at selected locations with lower register pressure. The compiler 22 can employ a "greedy" algorithm to find insertion locations with a local minimum register pressure within a preemption window, as described below.

A preemption widow may be the interval between two preemption instructions. The length of the preemption window interval may be determined by the estimated execution time of subsequent instructions, binary size and normal execution penalty, and a system responsiveness metric. Regarding the estimated execution time of subsequent instructions, it is noted that the latency of memory operations involved in saving/restoring execution states may be much higher than when executing typical EU instructions. If a preemption request is received while the EU 14 is executing instructions with high register pressure, the total time required for continuing executing the current thread until reaching the next preemption instruction with reduced register pressure can be much lower than forcing the preemption immediately. For instructions that are not far away from the end of the program, the compiler 22 may have the flexibility to decide to let the program run until completion without saving any registers when preemption requests occur at that point. That is, in one example, no preemption instruction is inserted near the end of the program when the estimated execution time of subsequent instructions is small.

Regarding binary size and execution penalty, since the preemption instruction 30 is not part of the original program, the instruction 30 may be set to no-op (that is, the instruction will not be carried out, that is, suppressed in the decode stage) in normal execution mode when there is no active preemption request. Therefore frequent insertion of preemption instructions may increase the binary size and penalize normal execution time as well as instruction cache performance. Thus, the preemption window size may be selected to avoid over-insertion of preemption instructions to minimize the execution penalty.

Regarding the system responsiveness requirement, the system may not wait too long to serve a preemption request as this could negatively impact the user interface experience. If the latency time is too great, a timeout detection and recovery (TDR) process may result. For example, for a large shader program, preemption instructions might be inserted at strategic points to ensure forward progress. In one instance, preemption instructions are inserted after each read operation that may incur unexpectedly long latency on page faults.

Achieving a balanced tradeoff among the estimated execution time, the binary size and normal execution penalty, and the system responsiveness requirement may involve an evaluation of the preemption operation cost and program execution time. The majority of the preemption cost comes from the context save/restore. Therefore the cost may be proportional to the amount of live execution states that must be saved/restored. The program execution time can be estimated through compile-time analysis, such as using the static cycle count derived from a machine model as done in the instruction scheduler. Such an approach, however, may not be a precise reflection of dynamic execution time and therefore may be adjusted. For example, if there is a loop in the program with a large unknown trip count inside the preemption window, it may take too long for the loop to complete and reach the next preemption instruction. In such a situation, a slice may be made inside the loop body to ensure that preemption can occur within a loop iteration.

In practice, the preemption instruction creator and inserter 26 of the compiler 22 is configured to choose a threshold that reflects the maximum number of ordinary instructions that can be executed with a reasonable delay (that is, a delay that does not impact the user interface experience), that is usually a fraction of the overall preemption latency and system response time limit. To mitigate the effect of any poor software decision due to an inaccurate compile-time analysis result, the illustrated timer 28 instructs the execution unit 14 to carry out the preemption request immediately if it takes the execution unit too long to reach the next preemption instruction. When the timer is triggered, all registers in GRF 16 and ARF 18 are conservatively saved/restored.

Figure 3:
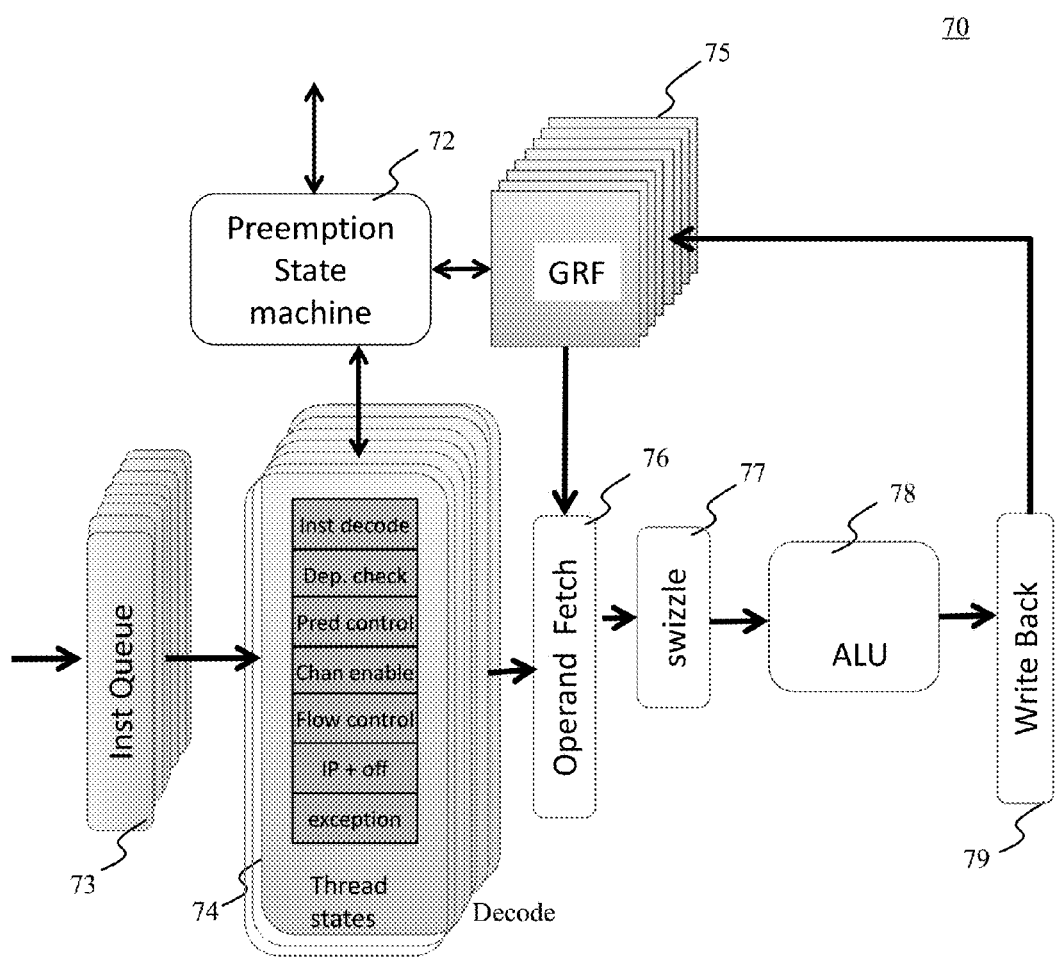
FIG. 3 is a block diagram of an example of an execution unit according to an embodiment.
Figure 4:
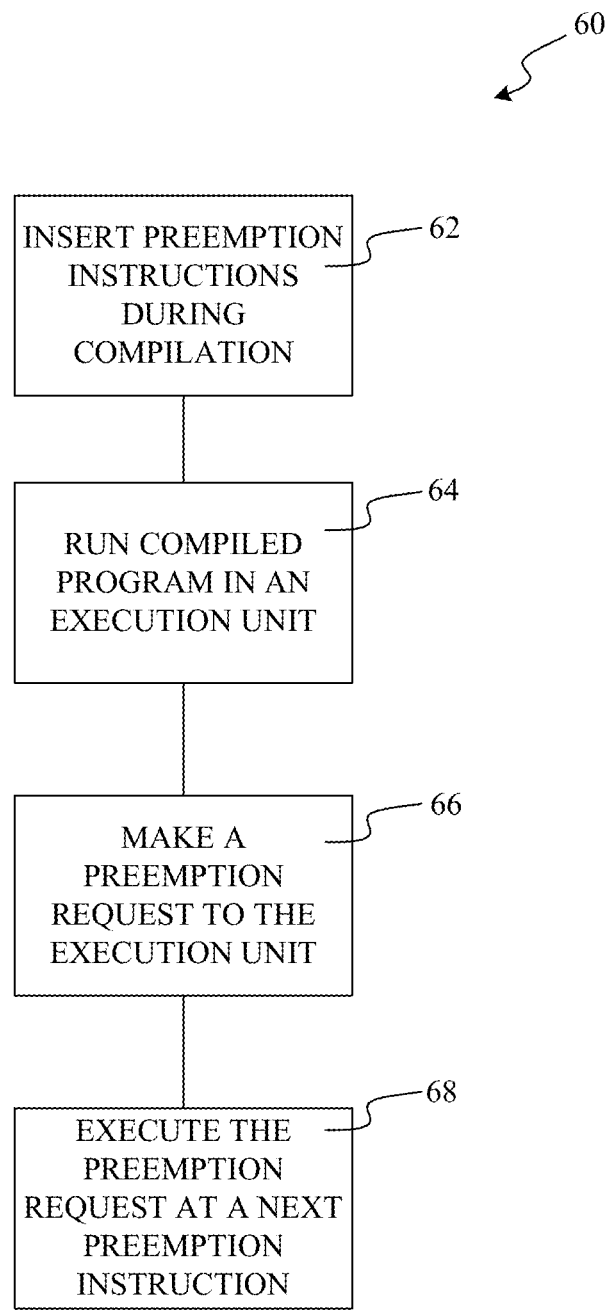
FIGS. 4 and 5 are flowcharts of examples of methods according to an embodiment.
Figure 5:
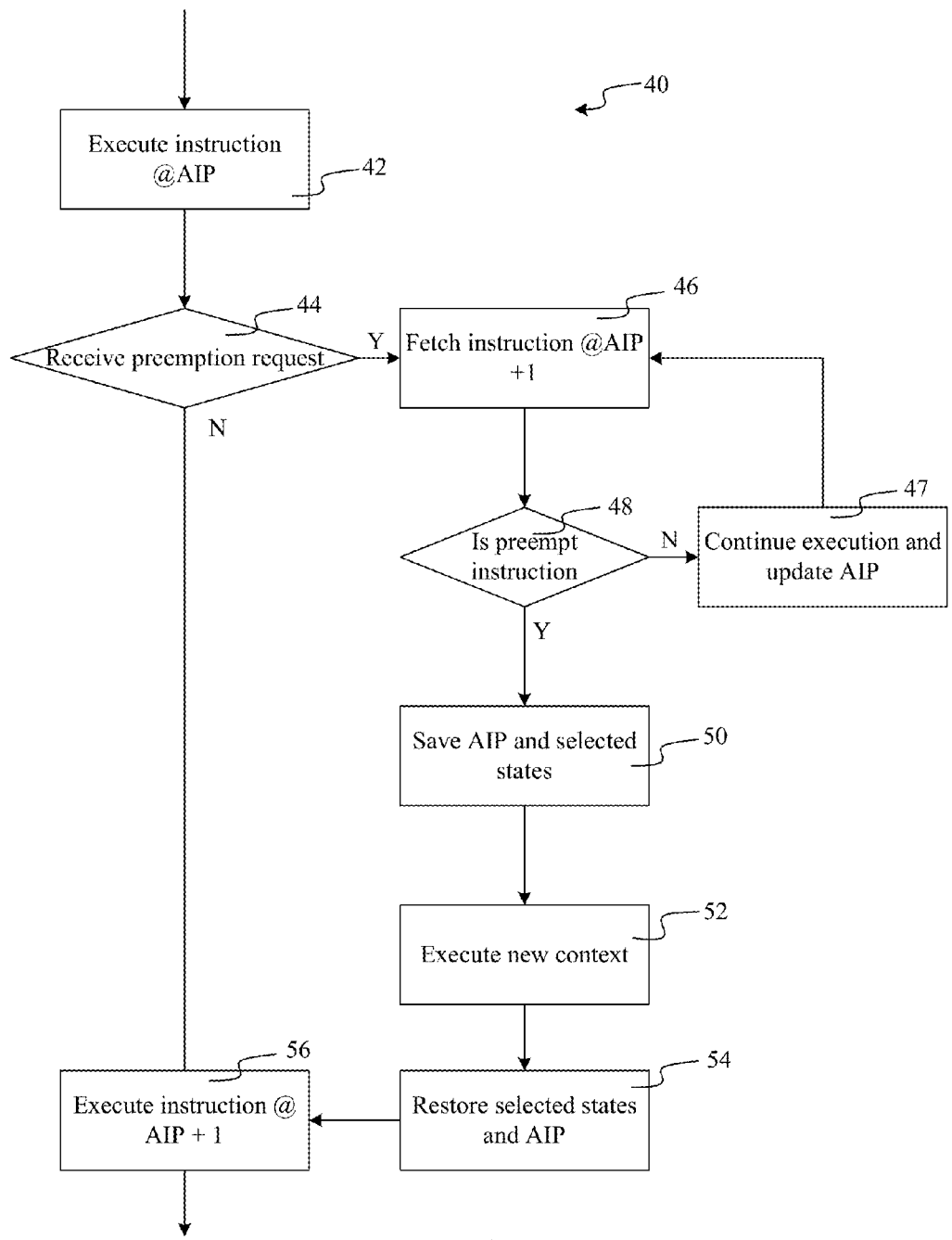

FIG. 3 is a block diagram of an example of an execution unit 70. Note that the execution unit 70 may operate simultaneously on eight threads as schematically depicted in FIG. 3; other numbers of multiple threads for processing may also be selected. The execution unit 70 may include a preemption state machine 72 to receive a preemption request and an instruction queue 73 to receive instructions from an instruction cache. Input from the preemption state machine and the instruction queue may be decoded at the decoder 74, which depicts various thread states including instruction decode, dependency check, predicate control, channel enable, flow control, IP+offset, and exception. The decoder 74 may discard preemption instructions for which there is no pending preemption request. If upon decoding there is a preemption instruction with a pending preemption request, the illustrated preemption state machine 72 interacts with the GRF and ARF 75 (note that the label GRF stands for both GRF and ARF in this Figure). One GRF/EU hardware thread is represented by each box of element 75 with 128 registers optionally selected for each GRF with 256 bits (8 floats) per register although other values may also be selected. The preemption state machine interacts with the GRF and ARF 75 and determines or is instructed which registers to save during preemption. If the decoded instruction is not a preemption instruction, it may proceed to the operand fetch 76, the swizzle/data reorder 77, the arithmetic logic unit (ALU) 78 and the write back 79 which sends data to the GRF/ARF 75.

With continuing reference to FIGS. 1-3, FIG. 4 depicts an overview flowchart of an example of method 60 performed by the system of FIG. 1 upon receipt of a preemption request. The method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In block 62, preemption instructions are inserted during compilation of a computer program. In block 64 the compiled program is run in an execution unit 14. In block 66, a preemption request is made to the execution unit 14. In block 68 the preemption request is executed/served at the next preemption instruction found in the compiled program.

With continuing reference to FIGS. 1-3, FIG. 5 depicts an overview flowchart of an example of detailed method 40 performed by the system of FIG. 1 upon receipt of a preemption request. The method 40 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Prior to receiving the preemption request, the execution unit 14/70 is executing a program instruction at the application instruction pointer (AIP) at processing block 42. Until the execution unit 14/70 receives a preemption request, it does not act upon inserted preemption instructions 30. When the preemption state machine 72 receives a preemption request 44, it will not stop running the current application at blocks 46, 47 (that is, it will continue application execution and update the AIP) until it encounters the next inserted preemption instruction 30 at block 48. At this point, the execution unit 14/70 may execute the preemption instruction 30. Since the live register map may be encoded in the preemption instruction, the preemption state machine 72 may be instructed exactly which execution states are to be saved, thereby saving any extra time and bandwidth that would have been required for saving inactive registers. This approach is shown at block 50 in the flowchart where the AIP and the selected states are saved. Further, the preemption state machine 72 can perform the save/restore operation at block 50 directly without involving a system routine. A system routine may incur extra context switch overhead and often involve extra instruction sequences in order to save/restore certain architectural registers.

After storing the selected states in the memory 24, the new context may be executed at block 52. The new context may be the context determined for execution by the preemption request. Once the new context has completed execution, the selected states and AIP may be restored at block 54. After restoring these states and the AIP, the next instruction in the preempted program is executed at illustrated block 56 and that program may continue being executed by execution unit 14/70.

In an alternative, in some systems it may be difficult to insert preemption instructions due to a hardware resource limit or other constraints. For such a case, a modified approach may involve saving static analysis results such as a preempt instruction pointer and live register information into an in-memory look-up table. When servicing a preemption request, the system routine can first retrieve this information and use it to save only the live registers so that there is still considerable preemption overhead reduction.

Figure 6:
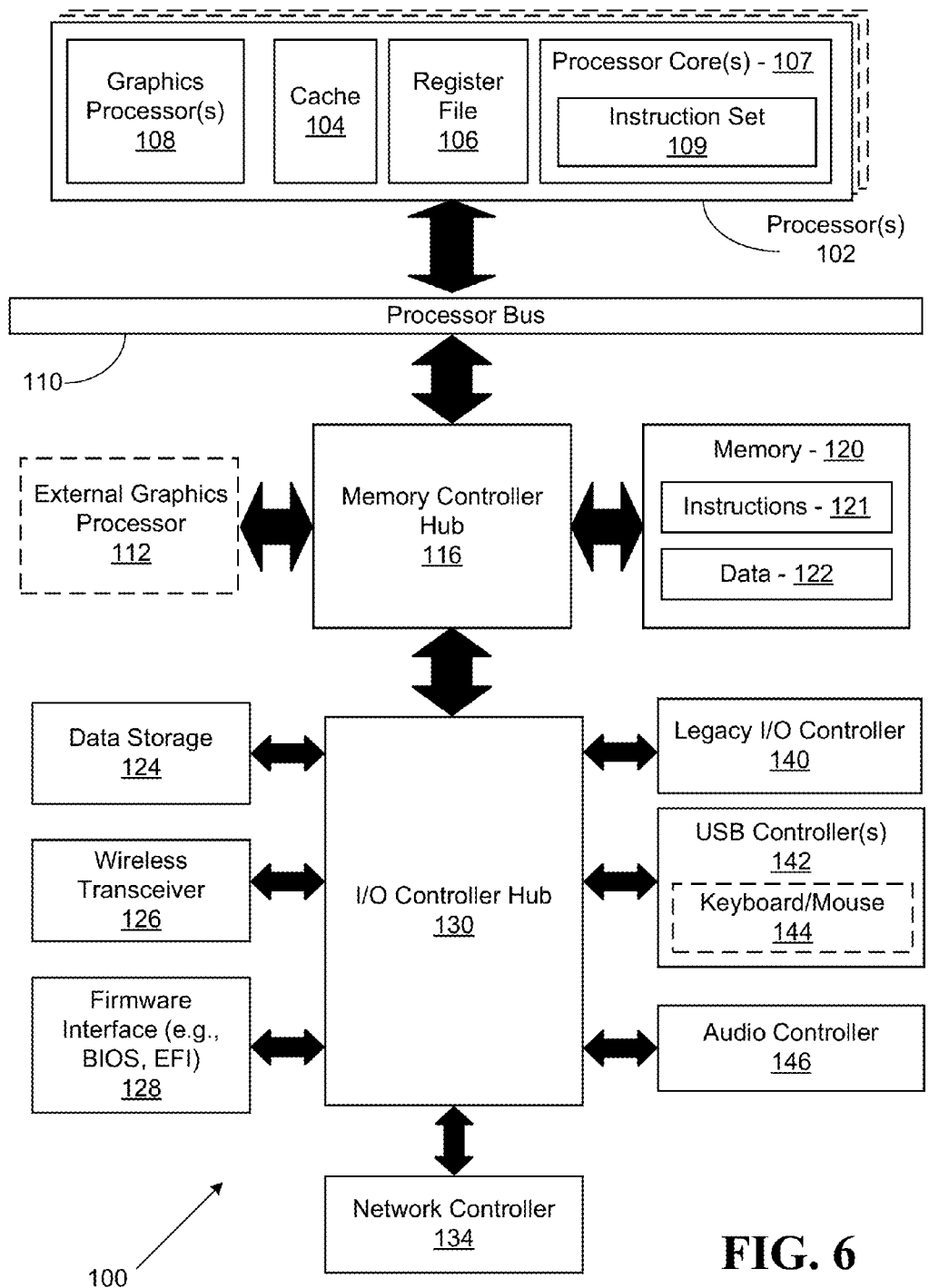
FIGS. 6-8 are block diagrams of an example of an overview of a data processing system according to an embodiment.
Figure 7:
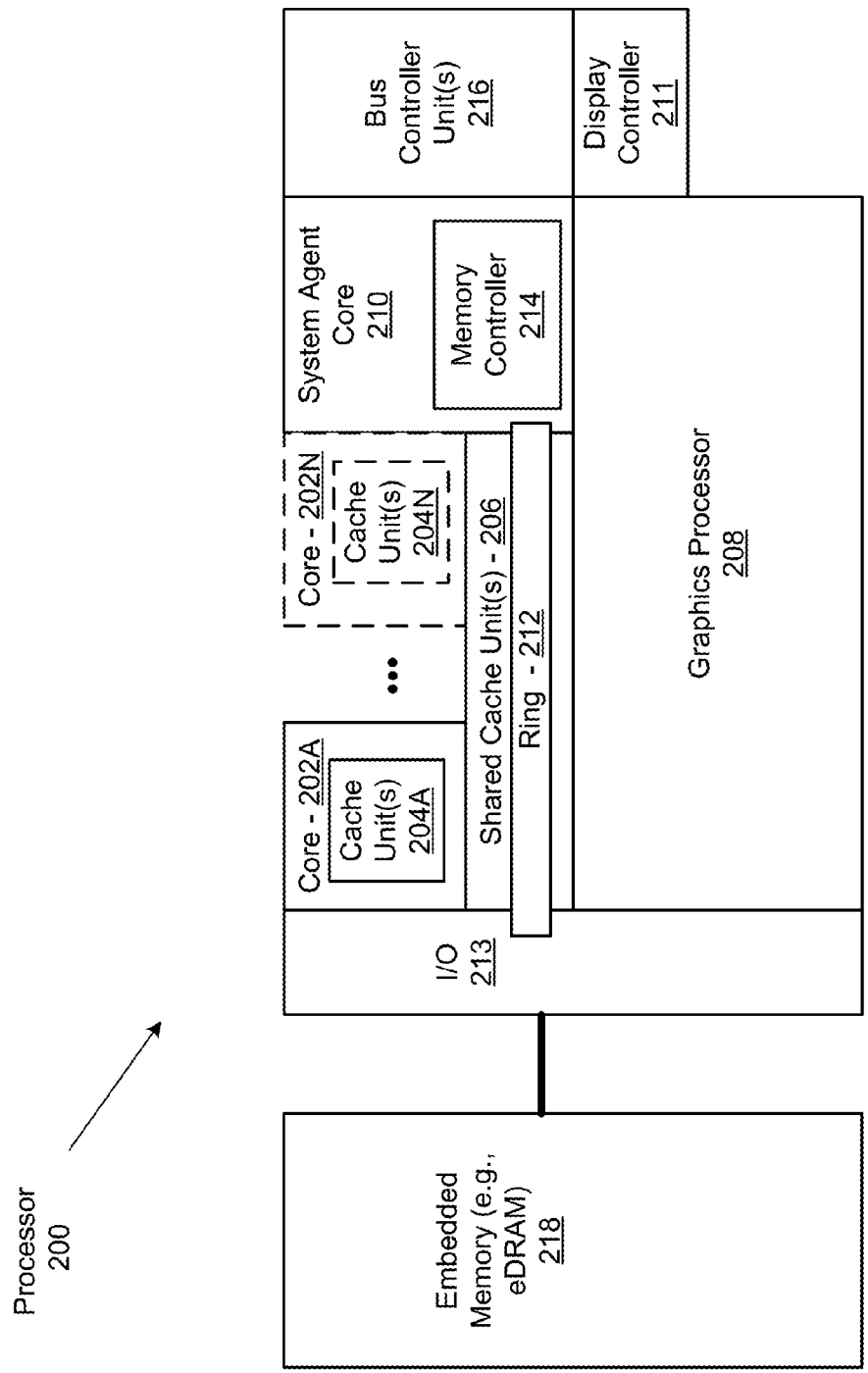
Figure 8:
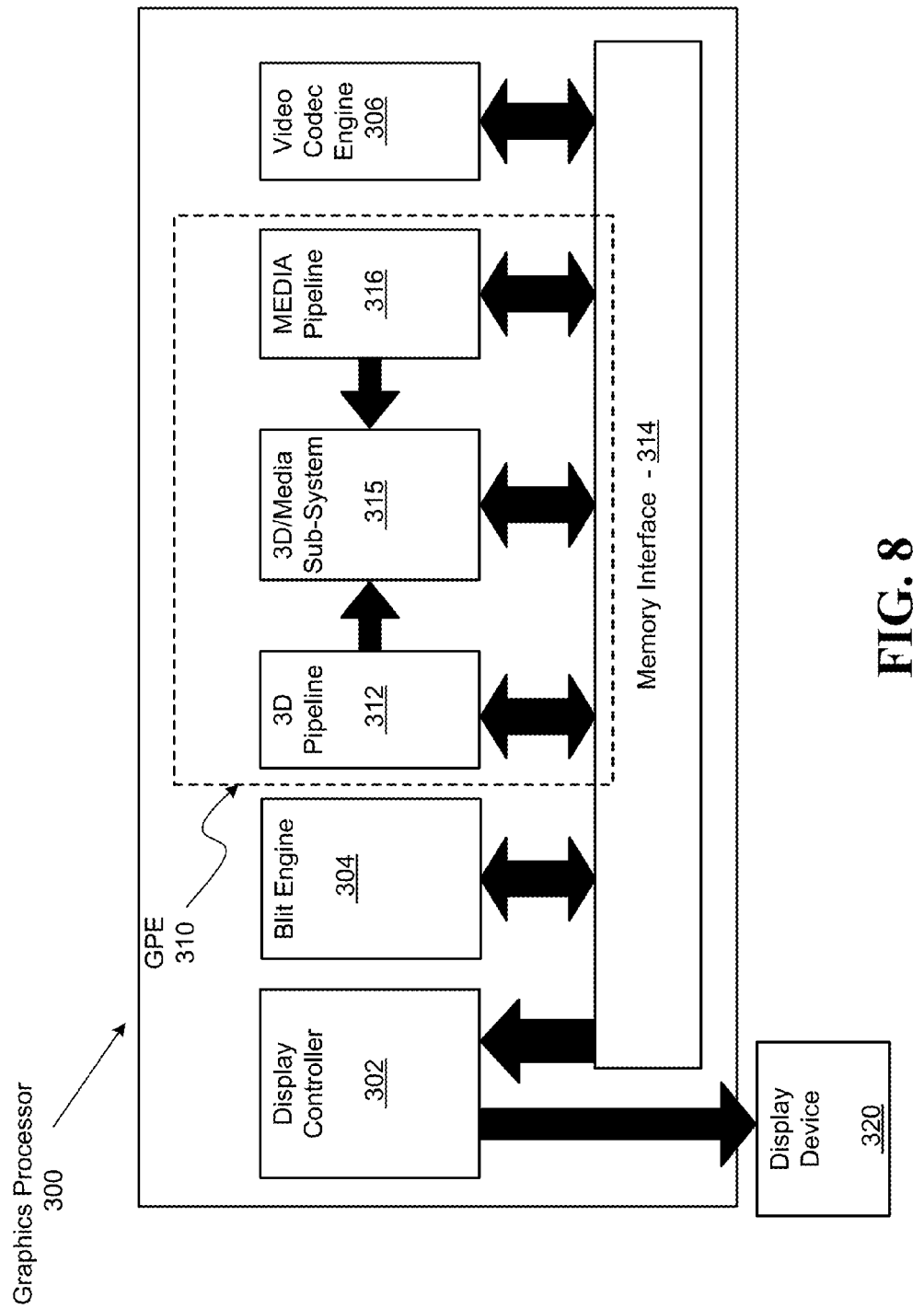

Overview—FIGS. 6-8

FIG. 6 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In one embodiment, the data processing system 100 is a system on a chip (SOC) integrated circuit for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 7 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units 216 manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be a separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 8 is a block diagram of one embodiment of a graphics processor 300 which may be a discrete graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE)

421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 9:
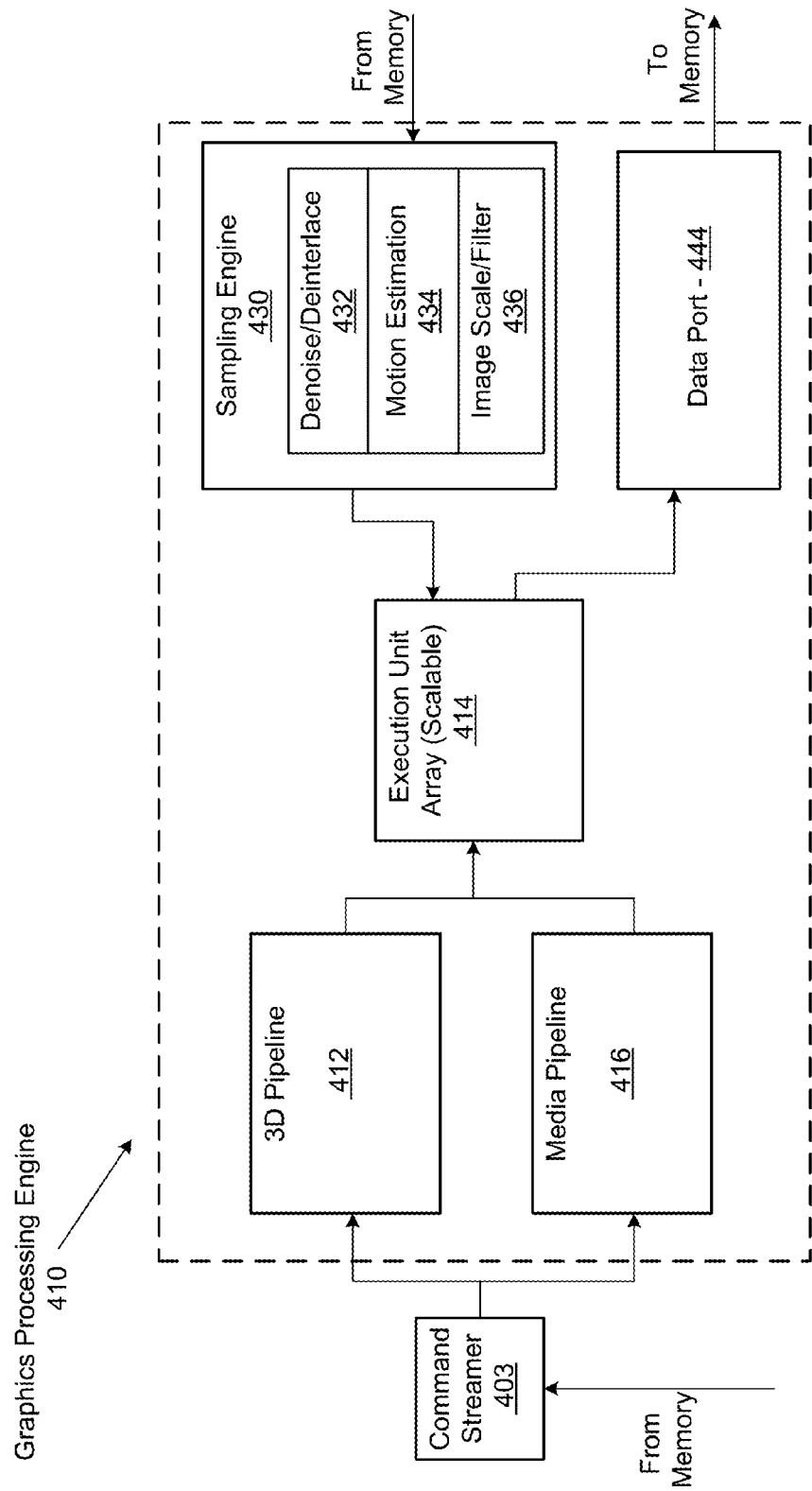
FIG. 9 is a block diagram of an example of a graphics processing engine according to an embodiment.

3D/Media Processing—FIG. 9

FIG. 9 is a block diagram of an embodiment of a graphics processing engine 410 for a graphics processor. In one embodiment, the graphics processing engine (GPE) 410 is a version of the GPE 310 shown in FIG. 8. The GPE 410 includes a 3D pipeline 412 and a media pipeline 416, each of which can be either different from or similar to the implementations of the 3D pipeline 312 and the media pipeline 316 of FIG. 8.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution unit array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single frame of video. The de-noise logic reduces or removes data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 10:
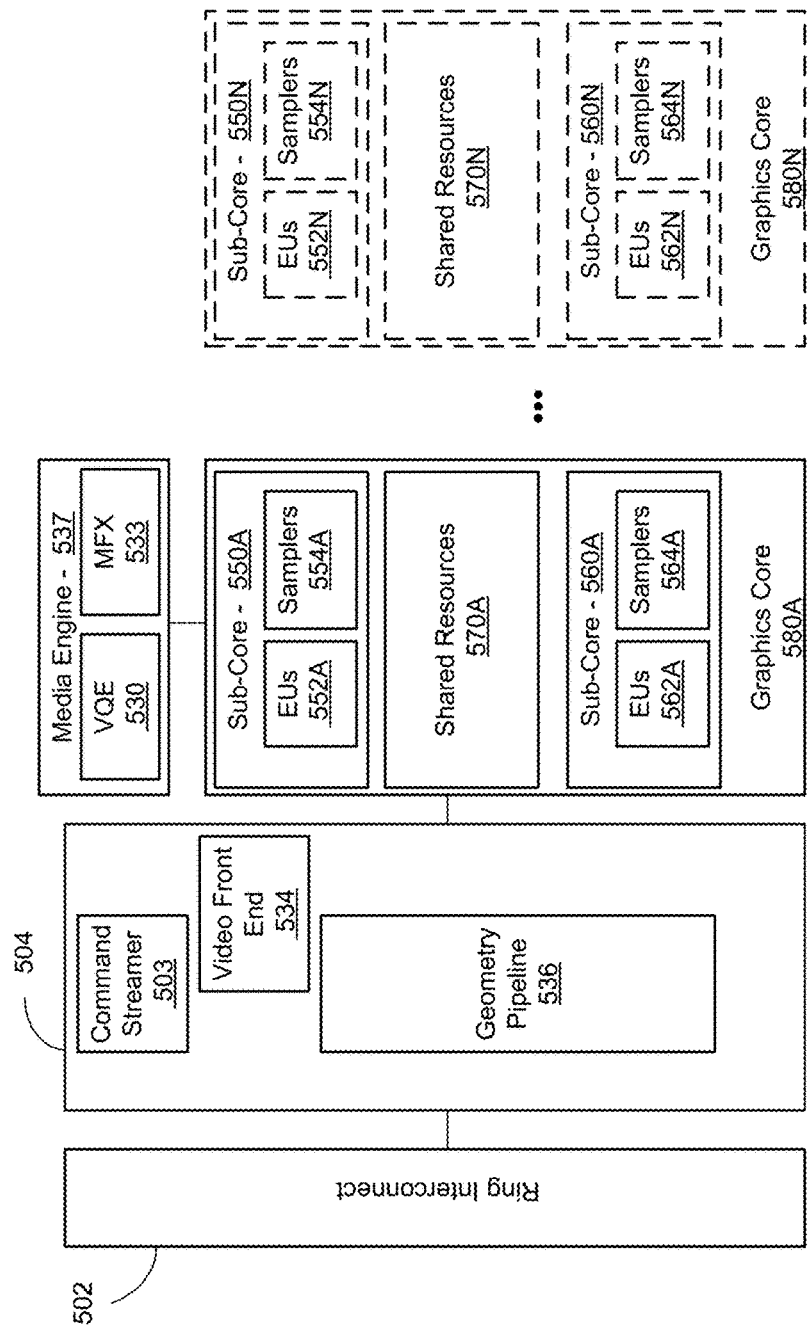
FIGS. 10-12 are block diagrams of examples of execution units according to an embodiment.
Figure 11:
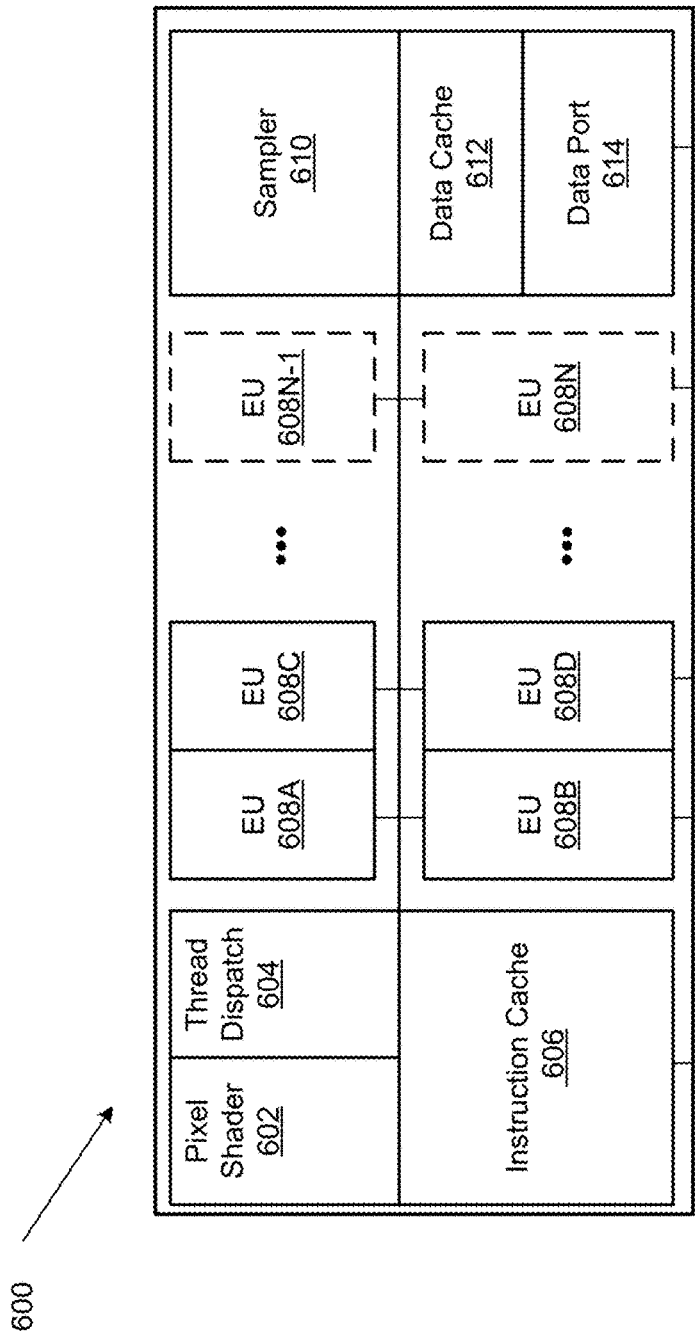
Figure 12:
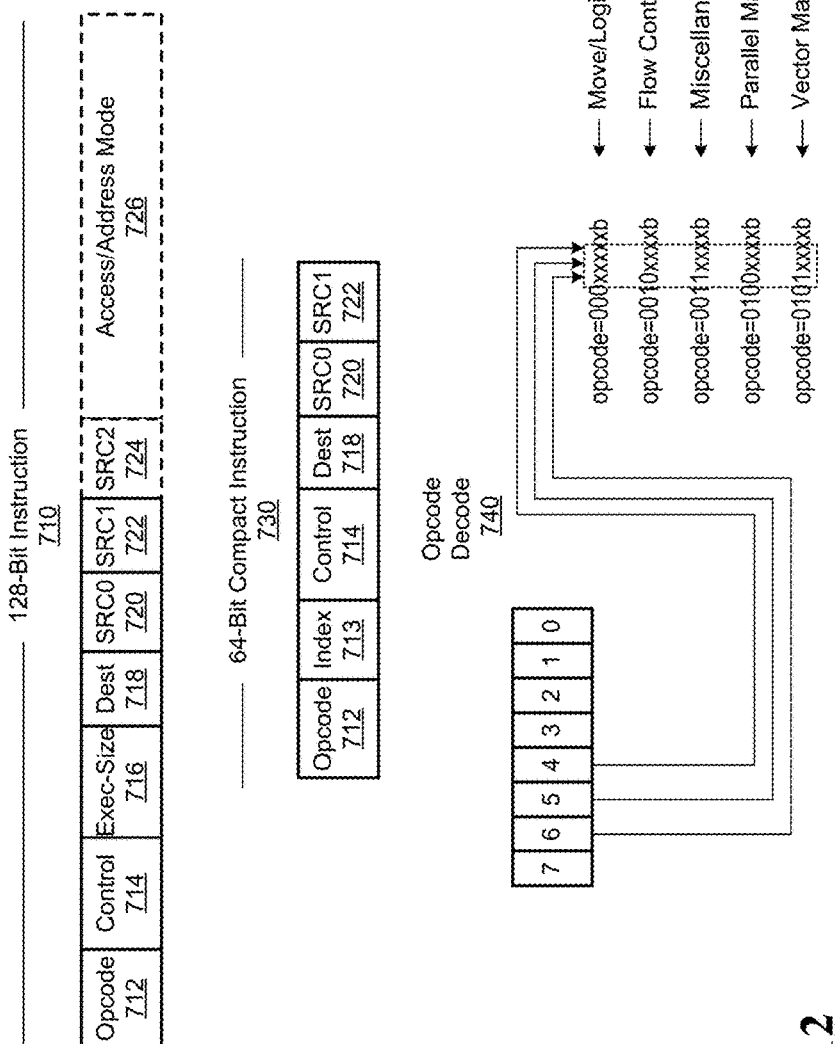

Execution Units—FIGS. 10-12

FIG. 10 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with the media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 11 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 10) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 12 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 714 enables control over certain execution options, such as channel selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
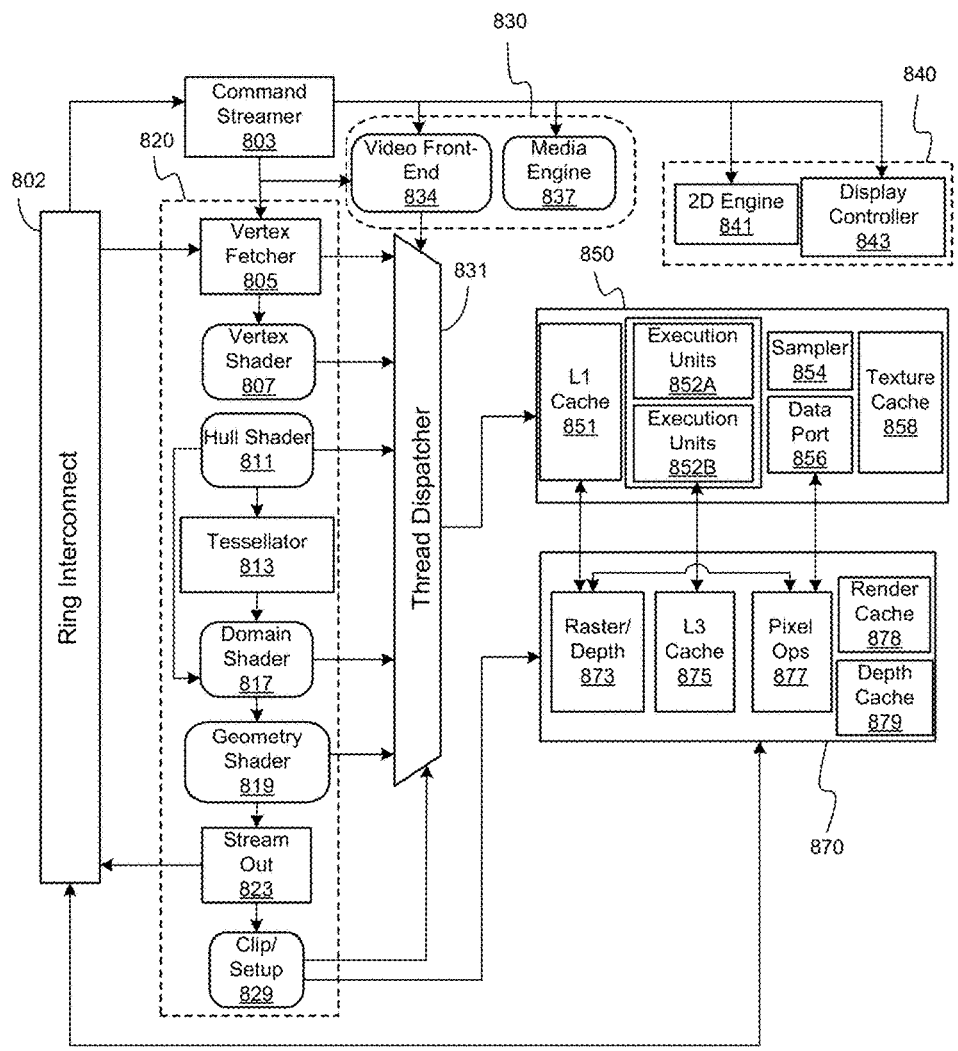
FIG. 13 is a block diagram of an example of a graphics pipeline according to an embodiment.

Graphics Pipeline—FIG. 13

FIG. 13 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 837 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine 837 includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
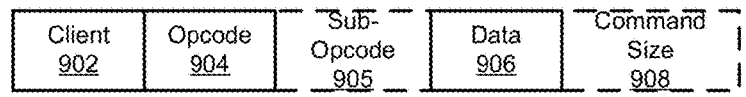
FIGS. 14A-14B are block diagrams of examples of graphics pipeline programming according to an embodiment.
Figure 14B:
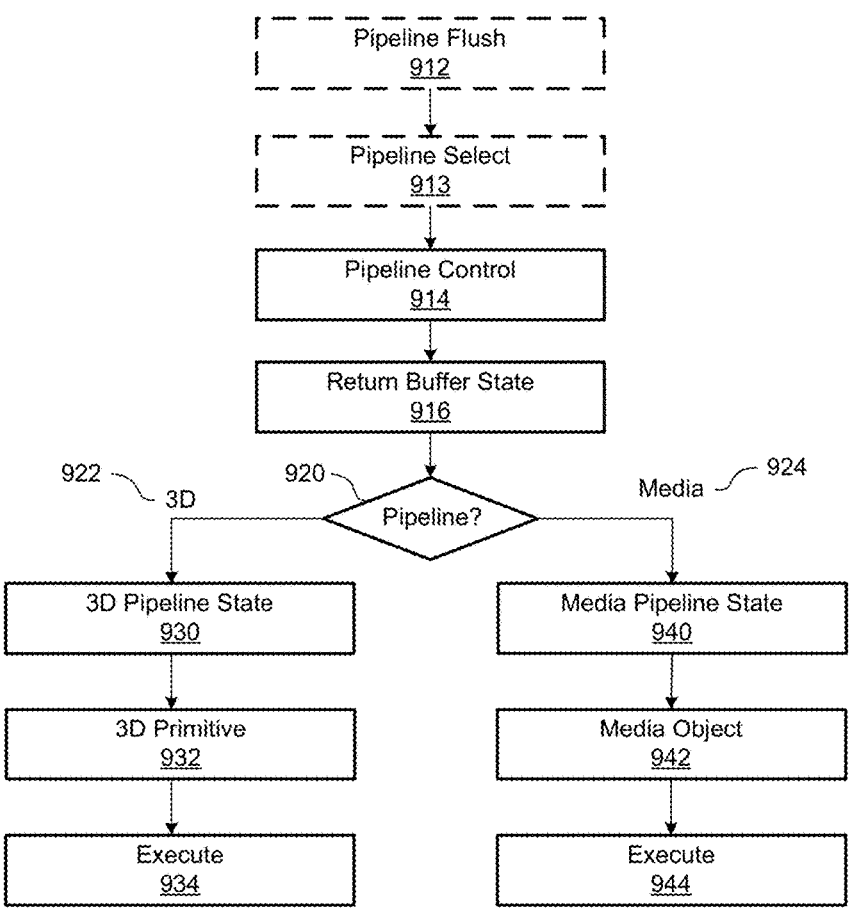

Graphics Pipeline Programming—FIGS. 14A-B

FIG. 14A is a block diagram illustrating a graphics processor command format according to an embodiment and FIG. 14B is a block diagram illustrating a graphics processor command sequence according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 14B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state commands 916 include selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use of one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 944 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 15:
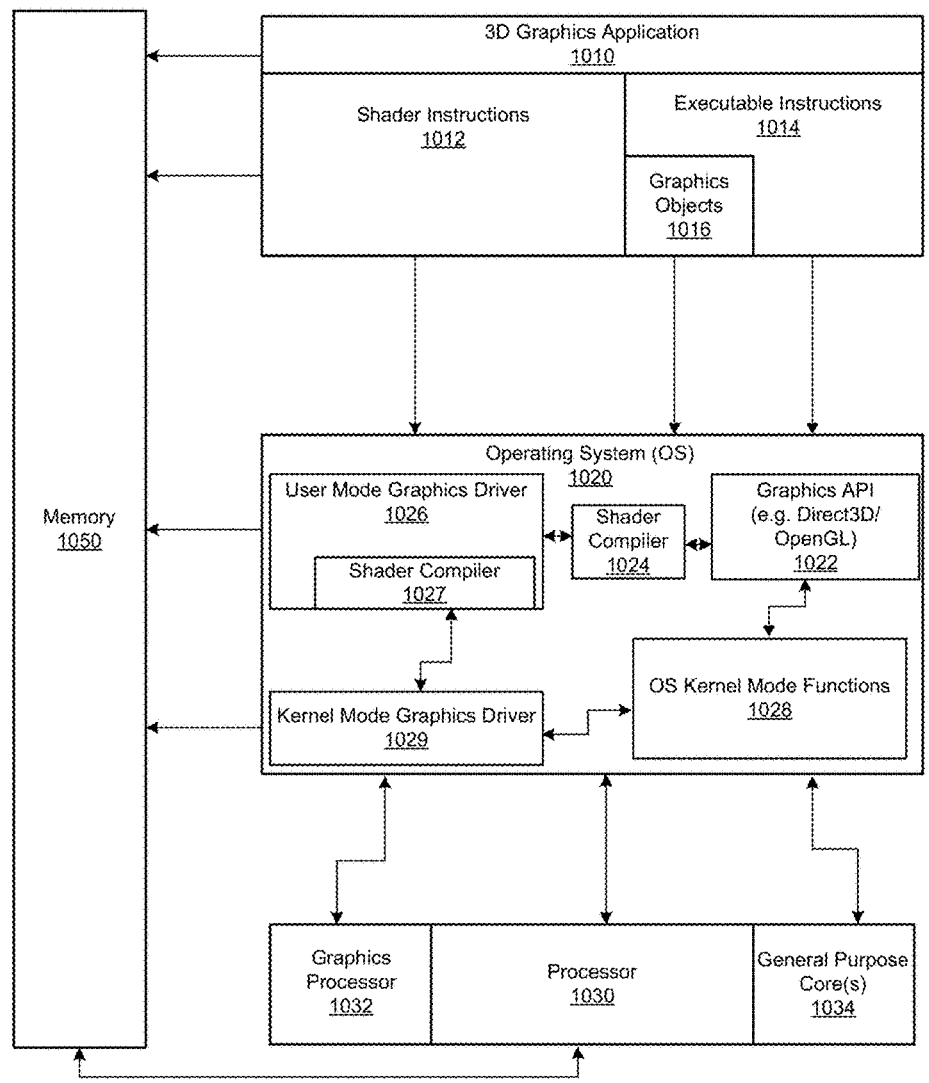
FIG. 15 is a block diagram of an example of a graphics software architecture according to an embodiment.

Graphics Software Architecture—FIG. 15

FIG. 15 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

ADDITIONAL NOTES AND EXAMPLES

Example 1 may include a computing system for executing a preemption request including a data interface to accept a preemption request and a compiler having a preemption instruction creator and inserter to create and insert plural preemption instructions at positions in a computer program with a reduced number of live registers within a defined preemption window. The computing system may further include an execution unit coupled to the compiler and the data interface to execute a compiled computer program with the plural preemption instructions, the execution unit including a plurality of registers in a general purpose register or an architecture register and memory communicating with the execution unit to store contents of live registers upon execution of the preemption request.

Example 2 may include the computer system of Example 1, wherein the execution unit further includes a control flow stack.

Example 3 may include the computer system of Example 1 or 2, further including an application instruction pointer associated with the execution unit.

Example 4 may include the computer system according to Examples 1, 2, or 3, further including a timer communicating with the execution unit.

Example 5 may include a method of processing a preemption request including inserting one or more preemption instructions while compiling a computer program, the one or more preemption instructions being inserted within a preemption window in the computer program that reduces the number of live registers at each preemption instruction position and wherein the preemption instruction instructs which registers are to be saved at a particular program position. The method includes running the compiled program in an execution unit, making a preemption request to the execution unit, and executing the preemption request at a next available preemption instruction in the program being run in the execution unit.

Example 6 may include the method of Example 5, further including saving register contents of the registers to be saved in a memory at the program position of the preemption instruction.

Example 7 may include the method of Example 6, wherein the registers are registers contained in the general register files or the architecture register files.

Example 8 may include the method of Example 5, 6, or 7, further including saving the contents of a control flow stack at the position of the preemption instruction.

Example 9 may include the method of Example 5, 6, 7, or 8, further including saving the position of an application instruction pointer at the position of execution of the preemption request.

Example 10 may include the method of Example 5, 6, 7, 8 or 9, further including creating a preemption window between adjacent preemption instructions, the preemption window defining a length of estimated execution time between the adjacent preemption instructions.

Example 11 may include the method of Example 5, 6, 7, 8, 9, or 10, further including analyzing the computer program to determine the positions to insert the one or more preemption instructions.

Example 12 may include a method of processing a preemption request according to Example 11, wherein the analyzing determines a register pressure based on a number of live registers at various positions within the computer program.

Example 13 may include at least one computer readable storage medium comprising a set of instructions which, when executed by a computing system, cause the computing system to insert preemption instructions while compiling a computer program, the preemption instructions being inserted at positions in the computer program that minimize the number of registers that are live at each computer program position and wherein the preemption instruction instructs which registers are required to be saved at that program position, run the compiled program in an execution unit, and execute a preemption request at the next available preemption instruction in the program being run in the execution unit.

Example 14 may include the at least one computer readable storage medium of Example 13, wherein the instructions, when executed, cause a computing system to save register contents of the registers to be saved in a memory at the program position of the preemption instruction.

Example 15 may include the at least one computer readable storage medium of Example 13 or 14, wherein the instructions, when executed, cause a computing system to save the contents of a control flow stack at the position of the preemption instruction.

Example 16 may include the at least one computer readable storage medium of Example 13, 14 or 15, wherein the instructions, when executed, cause a computing system to save the position of an application instruction pointer at the position of execution of the preemption request.

Example 17 may include the at least one computer readable storage medium of Example 13, 14, 15 or 16, wherein the instructions, when executed, cause a computing system to create a preemption window between adjacent preemption instructions, the preemption window defining a length of estimated execution time between the adjacent preemption instructions.

Example 18 may include the at least one computer readable storage medium of Example 13, 14, 15, 16, or 17, wherein the instructions, when executed, cause a computing system to analyze the computer program to determine the positions to insert the one or more preemption instructions.

Example 19 may include the at least one computer readable storage medium of Example 13, 14, 15, 16, 17, or 18, wherein the instructions, when executed, cause a computing system to determine a register pressure based on a number of live registers at various positions within the computer program.

Example 20 may include an apparatus including a compiler having a preemption instruction creator and inserter to create and insert plural preemption instructions at positions in a computer program with a reduced number of live registers within a defined preemption window. The apparatus further includes an execution unit coupled to the compiler and the data interface to execute a compiled computer program with the plural preemption instructions, the execution unit including a plurality of registers in a general purpose register or an architecture register; and a memory communicating with the execution unit to store contents of live registers upon execution of the preemption request.

Example 21 may include the apparatus of Example 20, the execution unit further including a control flow stack.

Example 22 may include the apparatus of Example 20 or Example 21, further including an application instruction pointer associated with the execution unit.

Example 23 may include the apparatus of Example 20 or Example 21, further comprising a timer to communicate with the execution unit.

Example 24 may include a computing system for executing a preemption request including means for performing the method of any of Examples 5 to 12, in any combination and/or sub-combination thereof. For example, Example 24 may include means for inserting one or more preemption instructions while compiling a computer program, the one or more preemption instructions being inserted within a preemption window in the computer program that reduces the number of live registers at each preemption instruction position and wherein the preemption instruction instructs which registers are to be saved at a particular program position; means for running the compiled program in an execution unit; means for making a preemption request to the execution unit; and means for executing the preemption request at a next available preemption instruction being run in the execution unit.

Example 25 may include the computing system of Example 24, further including means for saving register contents of the registers to be saved in a memory at the program position of the preemption instruction.

Example 26 may include the computing system of Example 25, wherein the registers are registers contained in the general register files or the architecture register files.

Example 27 may include the computing system of Examples 24, 25, or 26, further comprising means for saving the contents of a control flow stack at the position of the preemption instruction.

Example 28 may include the computing system of Example 24, 25, or 26, further including means for saving the position of an application instruction pointer at the position of execution of the preemption request.

Example 29 may include the computing system of Example 24, 25, or 26, further including means for creating a preemption window between adjacent preemption instructions, the preemption window defining a length of estimated execution time between the adjacent preemption instructions.

Example 30 may include the computing system of Example 24, 25, or 26, further including means for analyzing the computer program to determine the positions to insert the one or more preemption instructions.

Example 31 may include the computing system of Example 30, further including means for determining a register pressure based on a number of live registers at various positions within the computer program.

Techniques described herein may reduce the performance and storage overhead involved with execution of a preemption request. Through compile-time analysis, advantageous program preemption locations that reduce both save/restore overhead and response time can be determined. Typically, such an approach involves reducing the number of live registers that need to be saved/restored. New preempt instructions may be inserted by the compiler into a program that at runtime tells the hardware where to perform preemption and which registers are live and are to be saved. In a typical graphics shader program, for example, the compiler may insert a preempt instruction only after hundreds of program instructions to amortize the preemption cost and the actual register footprint to be saved may be considerably less than the total available number of general purpose registers and architecture registers.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a data interface to accept a preemption request;
   a compiler having a preemption instruction creator and inserter to:
      create a preemption window as an interval between two preemption instructions; and
      create and insert one or more extra preemption instructions, not part of a computer program and including a first field having one or more bits that define a preemption command itself and a second field having one or more bits that each independently specify a corresponding register to be saved at a particular program position, at one or more locations in the computer program based on where a number of live registers to be saved is at a local minimum within the preemption window;
   an execution unit coupled to the compiler and the data interface to execute a compiled computer program with the one or more extra preemption instructions, the execution unit including a plurality of registers in a general purpose register or an architecture register; and
   memory communicating with the execution unit to store contents of live registers upon execution of the preemption request.

2. A computer system according to claim 1, the execution unit further comprising a control flow stack.

3. A computer system according to claim 1, further comprising an application instruction pointer associated with the execution unit.

4. A computer system according to claim 1, further comprising a timer communicating with the execution unit.

5. A method of processing a preemption request comprising:
   creating a preemption window as an interval between two preemption instructions;
   creating and inserting one or more extra preemption instructions, not part of a computer program and including a first field having one or more bits that define a preemption command itself and a second field having one or more bits that each independently specify a corresponding register to be saved at a particular program position, while compiling the computer program, at one or more locations in the computer program based on where a number of live registers to be saved is at a local minimum within the preemption window;
   running a compiled program with the one or more extra preemption instructions in an execution unit;
   making a preemption request to the execution unit; and
   executing the preemption request at a next available preemption instruction in the compiled program being run in the execution unit.

6. A method according to claim 5, further comprising saving register contents of the live registers to be saved in a memory at a location of a preemption instruction.

7. A method according to claim 6, wherein the live registers are registers contained in the general register files or the architecture register files.

8. A method according to claim 5, further comprising saving contents of a control flow stack at a location of a preemption instruction.

9. A method according to claim 5, further comprising saving a position of an application instruction pointer at a position of execution of the preemption request.

10. A method according to claim 5, wherein the preemption window defines a length of estimated execution time between the two preemption instructions.

11. A method according to claim 5, further comprising analyzing the computer program to determine the one or more locations to insert the one or more preemption instructions.

12. At least one non-transitory computer readable storage medium comprising a set of instructions which, when executed by a computing system, cause the computing system to:
   create a preemption window as an interval between two preemption instructions;
   create and insert one or more extra preemption instructions, not part of a computer program and including a first field having one or more bits that define a preemption command itself and a second field having one or more bits that each independently specify a corresponding register to be saved at a particular program position, while compiling the computer program, at one or more locations in the computer program based on where a number of live registers to be saved is at a local minimum within the preemption window;
   run a compiled program with the one or more extra preemption instructions in an execution unit; and
   execute a preemption request at a next available preemption instruction in the compiled program being run in the execution unit.

13. The at least one computer readable storage medium of claim 12, wherein the instructions, when executed, cause a computing system to save register contents of the live registers to be saved in a memory at a location of a preemption instruction.

14. The at least one computer readable storage medium of claim 12, wherein the instructions, when executed, cause a computing system to save contents of a control flow stack at a location of a preemption instruction.

15. The at least one computer readable storage medium of claim 12, wherein the instructions, when executed, cause a computing system to save a position of an application instruction pointer at a position of execution of the preemption request.

16. The at least one computer readable storage medium of claim 12, wherein the preemption window defines a length of estimated execution time between the two preemption instructions.

17. The at least one computer readable storage medium of claim 12, wherein the instructions, when executed, cause a computing system to analyze the computer program to determine the one or more locations to insert the one or more preemption instructions.

18. An apparatus comprising:
a compiler having a preemption instruction creator and inserter to:
create a preemption window as an interval between two preemption instructions; and
create and insert one or more extra preemption instructions, not part of a computer program and including a first field having one or more bits that define a preemption command itself and a second field having one or more bits that each independently specify a corresponding register to be saved at a particular program position, at one or more locations in the computer program based on where a number of live registers to be saved is at a local minimum within the preemption window;
an execution unit coupled to the compiler to execute a compiled computer program with the one or more extra preemption instructions, the execution unit including a plurality of registers in a general purpose register or an architecture register; and
memory communicating with the execution unit to store contents of live registers upon execution of a preemption request.

19. The apparatus of claim 18, the execution unit further comprising a control flow stack.

20. The apparatus of claim 18, further comprising an application instruction pointer associated with the execution unit.

21. The apparatus of claim 18, further comprising a timer to communicate with the execution unit.

22. The apparatus of claim 18, wherein the preemption window is to be created based on estimated execution time of subsequent instructions relative to a candidate insertion point, execution penalty relative to instruction over-insertion, and system responsiveness relative to program forward progress.

* * * * *